(12) United States Patent
Owens et al.

(10) Patent No.: US 6,228,913 B1
(45) Date of Patent: May 8, 2001

(54) PROCESS OF IMPROVING THE LEVELING OF A FLOOR POLISH COMPOSITION

(75) Inventors: Joseph Michael Owens, North Wales; Theodore Tysak, Ambler; Alvin Charles Lavoie, Landsdale, all of PA (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 09/263,753

(22) Filed: Mar. 5, 1999

Related U.S. Application Data

(60) Provisional application No. 60/078,286, filed on Mar. 17, 1998.

(51) Int. Cl.[7] .................................................. C08K 5/15
(52) U.S. Cl. ............................................................ 524/110
(58) Field of Search ................................................ 524/110

(56) References Cited

U.S. PATENT DOCUMENTS

| | | | | |
|---|---|---|---|---|
| 4,002,619 | * | 1/1977 | Dengler et al. | 524/110 |
| 5,650,456 | * | 7/1997 | Yun et al. | 524/110 |

OTHER PUBLICATIONS

Vol 096, No. 012, Dec. 26, 1996 & JP 08 209071 A (Sofuto Kyukyu Corp:KK), Aug. 13, 1996 *abstract*.

* cited by examiner

*Primary Examiner*—Kriellion Sanders

(57) ABSTRACT

The leveling of a floor polish composition can be improved by adding coumarin and/or a coumarin derivative thereto in an amount of from 0.05 to 10% by weight of polymer solids in said composition.

18 Claims, No Drawings

PROCESS OF IMPROVING THE LEVELING OF A FLOOR POLISH COMPOSITION

This application claims benefit of Provisional No. 60/078,286, filed Mar. 17, 1998.

This invention is concerned with a process of improving the leveling of a floor polish composition and a floor polish composition having improved leveling.

Floor polish compositions comprise floor polish vehicle compositions together with one or more other useful floor polish ingredients such as alkali soluble resins, plasticizers, waxes, preservatives, dispersing agents, coalescents, leveling agents and optical brighteners.

Leveling agents are added to floor polish compositions to improve the appearance of the polish once it has been applied on a floor. Such agents are well known in the art and include, for example, fluorochemicals (see David A Butman & Myron T Pike, Chemical Times and Trends, The Journal of Chemical Specialties Manufacturers Association, January 1981, long chain alcohols (see U.S. Pat. No. 4,460,734), esters such as isobutyl isobutyrate, terpenol compounds such as pine oil, and organic phosphates such as tributoxy ethyl phosphate. It is an object of the present invention to improve the leveling properties of a floor polish composition, which composition may already include a conventional leveling agent.

A compound which offers dual functionality in a floor polish composition can be very desirable to the polish formulator: such compounds can be used advantageously in floor polish compositions either to supplement one or more other components to obtain higher performance polishes or to substitute, in whole or in part, one or more other components in a polish composition without loss of performance. Accordingly, it is a further object of the present invention to identify a compound which can offer not only improved leveling properties in a floor polish composition but also some other property pertinent to a polish composition.

Some solvents are known to possess dual functionality, in that they are capable of contributing other useful properties to a floor polish. For example, in U.S. Pat. No. 4,371,398, there is disclosed a polish composition comprising (1) a liquid water-insoluble polyolefin formed by polymerizing alpha-olefins of the formula RCH=CH2 where R is a hydrocarbon group, (2) an emulsifier for said polyolefin, (3) a solvent, and (4) water. It is taught in the reference that any suitable solvent can be employed in the polish provided it achieves the desired results without substantial deleterious effects. Hydrocarbons such as mineral spirits, kerosene, xylenes and carbitol type solvents are identified in the reference as examples of such suitable solvents. Other compounds such as isobutyl isobutyrate and pine oil are also disclosed as being suitable solvents in the polish. Isobutyl isobutyrate and pine oil are disclosed as leveling agents.

Optical brighteners are added to floor polish compositions to improve the brightness or cleanliness of the polish once it has been applied on a floor. Examples of optical brighteners are disclosed in EP-A-0696625 and U.S. Pat. No. 4,371,398, and include distyrylbiphenyl- and stilbene-derivatives, sold by Ciba-Geigy under the TINOPAL trade name; and 2,2'-(2,5-thiophenediyl)bis[5-tert-butylbenzoxazole], available from Ciba-Geigy as UVITEX OB. Also, it is suggested in U.S. Pat. No. 4,371,398 that coumarin derivatives such as 4-methyl-7-diethylamine coumarin may be used as an optical brightener in a polish composition, but no polish composition comprising such a derivative is specifically disclosed.

Leveling of electrodeposited nickel is known to be improved in the presence of coumarin (see, for example, Investigation of reflectivity and structure of electrodeposited nickel during electrolysis; A. T. Vagramyan and N. K. Baraboshkina; Plating; August 1967; pages 930 to 940).

In accordance with the present invention there is provided a process of improving the leveling of a floor polish composition comprising an aqueous suspension or dispersion of water insoluble emulsion polymer, wherein the process comprises adding coumarin and/or a derivative thereof to said composition in an amount of from about 0.05 to about 10% by weight of polymer solids in the composition. Preferably, the coumarin and/or derivative thereof is present in an amount of from 0.1 to 5% by weight of said polymer solids.

It has been found that floor polish compositions comprising coumarin and/or a derivative thereof have improved leveling properties over similar polish compositions but which comprise no leveling agent. It has also been found that the leveling properties of a polish composition which already comprises a leveling agent can be improved through the addition of coumarin and/or a derivative thereof, even when present in very low quantities. This finding is particularly surprising since hitherto these compounds have only been suggested for incorporation into floor polish compositions to improve brightness (U.S. Pat. No. 4,371,398). Indeed, we have been able to confirm that floor polish compositions comprising coumarin and/or coumarin derivatives have improved leveling and improved brightness, thereby enabling the floor polish formulator to provide a high performance polish composition.

In another aspect of the present invention, there is provided a floor polish composition comprising coumarin and/or a coumarin derivative in an amount of from 0.05 to 10%, preferably 0.1 to 5%, by weight of polymer solids in said composition.

In yet another aspect of the present invention, there is provided the use in a floor polish composition of coumarin and/or a derivative thereof in an amount of 0.05 to 10%, preferably 0.1 to 5%, by weight of polymer solids in said composition to improve leveling of said polish.

Preferably the coumarin or coumarin derivative has the following general structure:

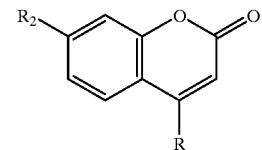

where R is H or a (C1 to C12) alkyl or a (C3–C1) cycloaliphatic group or a (C1 to C12) alkyl halide group or a carboxy group and $R_2$ is H or a hydroxy (—OH) or an amine (—$NH_2$) or a (C1 to C12) alkyl amine or a cycloaliphatic amine group. Preferably, the coumarin or coumarin derivative are selected from the group consisting of coumarin, 7-diethylamino-4-methylcoumarin, 7-hydroxy-4-methylcoumarin, 7-amino-4-methylcoumarin, {7-(dimethylamino)-2,3-dihydrocyclopenta-[c][1]benzopyran-4(1H)-one}, {7-(dimethylamino)-4-(trifluoromethyl)coumarin}{, {2,3,6,7-tetrahydro-9-(trifluoromethyl)-1H,5H,11H-[1]benzopyrano[6,7,8-ij]quinnolizin-11-one}, coumarin-3-carboxylic acid, 3-[2-(diethylamino)ethyl]-7-hydroxy-4-methylcoumarin, and dihydrocoumarin. The most preferred coumarin derivative useful in the present invention is a compound of the formula:

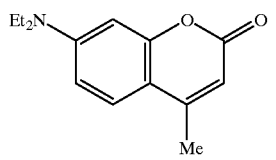

7-(diethylamino)-4-methylcoumarin
[Coumarin 1]

The floor polish compositions of the present invention preferably comprise an aqueous suspension or dispersion of one or more water insoluble emulsion polymers containing acid functional residues and, optionally, polyvalent metal ion or complex crosslinking agents. For example, such compositions are disclosed in U.S. Pat No. 3,328,325, U.S. Pat. No. 3,467,610, U.S. Pat. No. 3,554,790, U.S. Pat. No. 3,573,329, U.S. Pat. No. 3,711,436, U.S. Pat. No. 3,808,036, U.S. Pat. No. 4,150,005, U.S. Pat. No. 4,517,330, U.S. Pat No. 5,149,745, U.S. Pat No. 5,319,018, U.S. Pat. No. 5,574,090 and U.S. Pat. No. 5,676,741. Preferably, the water insoluble (emulsion copolymer has a Tg of at least 10° C., more preferably at least 40° C. calculated using the Fox Equation: $1/Tg = W_A/Tg_A + W_B/Tg_{,B}$ where Tg is the glass transition temperature ($°K$, $Tg_A$ and $Tg_{,B}$ are the glass transition temperatures of the homopolymers A and B, and $W_A$ and $W_B$ represent the weight fractions of the components A and B of the copolymer, respectively (T. G. Fox, Bull. Am. Phys. Soc. 1, 123 (1956)).

The water insoluble polymer is preferably formed from a monomer mix comprising 0% or up to 70%, preferably 10% to 50%, by weight of at least one vinyl aromatic monomer; 3% to 50%, preferably 5% to 20%, by weight of at least one acidic monomer; and no more than 97%, preferably 30% to 97% and more preferably 30% to 70%, by weight of at least one monomer selected from the ($C_1$–$C_{20}$) alkyl (meth) acrylates, preferably the ($C_1$–$C_{12}$) alkyl (meth)acrylates.

Preferably, the vinyl aromatic monomer(s) is/are alpha, beta ethylenically unsaturated aromatic monomers and is/are preferably selected from the group consisting of styrene (Sty), vinyl toluene, 2-bromo styrene, o-bromo styrene, p-chloro styrene, o-methoxy styrene, p-methoxy styrene, allyl phenyl ether, allyl tolyl ether and alpha-methyl styrene. Sty is the most preferred monomer.

Preferably, the acidic monomer(s) is/are alpha, beta monoethylenically unsaturated acids and is/are preferably selected from the group consisting of maleic acid, fumaric acid aconitic acid, crotonic acid, citraconic acid, acryloxypropionic acid, acrylic acid, methacrylic acid (MAA) and itaconic acid. MAA is the most preferred. Other acidic monoethylenically unsaturated monomers that may be copolymerized to form the water insoluble, film forming polymers are partial esters of unsaturated aliphatic dicarboxylic acids and the alkyl half esters of such acids. For example, the alkyl half esters of itaconic acid, fumaric acid and maleic acid wherein the alkyl group contains 1 to 6 carbon atoms such as methyl acid itaconate, butyl acid itaconate, ethyl acid fumarate, butyl acid fumarate and methyl acid maleate.

The monomer mix comprises no more than 97% by weight of at least one monomer selected from methyl methacrylate (MMA), methyl acrylate, ethyl acrylate, ethyl methacrylate, n-butyl acrylate (BA), butyl methacrylate (BMA), iso-butyl methacrylate (IBMA), 2-ethyl hexyl acrylate, n-octyl acrylate, sec-butyl acrylate, cyclopropyl methacrylate, acetoacetoxyethyl acrylate, acetoacetoxyethyl methacrylate, acetoacetoxypropyl acrylate, acetoacetoxypropyl methacrylate, acetoacetoxybutyl acrylate, acetoacetoxybutyl methacrylate, 2,3-di(acetoacetoxy) propyl acrylate, 2,3-di(acetoacetoxy) propyl methacrylate and allyl acetoacetate.

The monomer mix may also comprise 0% or up to 40% by weight of at least one polar or polarizable nonionogenic hydrophilic monomer, such as acrylonitrile, methacrylonitrile, cis- and trans- crotononitrile, alpha-cyanostyrene, alpha-chloroacrylonitrile, ethyl vinyl ether, isopropyl vinyl ether, isobutyl- and butyl-vinyl ether, diethylene glycol vinyl ether, decyl vinyl ether, vinyl acetate, isobornyl methacrylate, hydroxyalkyl (meth) acrylates such as 2-hydroxy ethyl methacrylate, 2-hydroxyethyl acrylate, 3-hydroxy propyl methacrylate, butanediol acrylate, 3-chloro-2-hydroxypropyl acrylate, 2-hydroxypropyl acrylate, 2-hydroxypropyl methacrylate, and vinyl thiols such as 2-mercaptopropyl methacrylate, 2-sulphoethyl methacrylate, methyl vinyl thiol ether and propyl vinyl thio ether.

The monomer mix may also comprise 0% or up to 10% by weight of at least one monomeric vinyl ester in which the acid moiety of the ester is selected from the aromatic and ($C_1$ to $C_{18}$) aliphatic acids. Such acids include formic, acetic, propionic, n-butyric, n-valeric, palmitic, stearic, phenyl acetic, benzoic, chloroacetic, dichloroacetic, gamma-chloro butyric, 4-chlorobenzoic, 2,5-dimethyl benzoic, o-toluic, 2,4,5-trimethoxy benzoic, cyclobutane carboxylic, cyclohexane carboxylic, 1-(p-methoxy phenyl)cyclohexane carboxylic, 1-(p-tolyl)-1-cyclopentane carboxylic, hexanoic, myristic, and p-toluic acids. The hydroxy vinyl moiety of the monomer may for example be selected from hydroxy vinyl compounds such as hydroxy ethylene, 3-hydroxy-pent-1-ene, 3,4-dihydroxybut-1-ene, and 3-hydroxy-pent-1-ene, it being understood that such derivation can be purely formal such as in the case of the vinyl acetate monomer in which the compound may be considered to be derived from acetic acid and hydroxy ethylene, although the monomer cannot in fact be prepared from such a precursor compound.

The process for the preparation of the aqueous dispersible water insoluble polymers of this invention is well known in the art. The practice of emulsion polymerization is discussed in detail in D. C. Blackley, Emulsion Polymerization (Wiley, 1975). The latex polymers of this invention may also be formulated using internally plasticized polymer emulsions. Preparation of internally plasticized polymer emulsions is described in detail in U.S. Pat. No. 4,150,005 and the preparation of non-internally plasticized floor polish emulsion polymers is described in U.S. Pat. No. 3,573,239, U.S. Pat. No. 3,328,325, U.S. Pat. No. 3,554,790 and U.S. Pat. No. 3,467,610.

Conventional emulsion polymerization techniques as described above may be used to prepare the polymer latices of this invention. Thus the monomers may be emulsified with anionic or nonionic dispersing agents; about 0.5% to 10% thereof on the weight of total monomers preferably being used. Acidic monomers are water soluble and thus serve as dispersing agents which aid in emulsifying the other monomers used. A polymerization initiator of the free radical type, such as ammonium or potassium persulphate, may be used alone or in conjunction with an accelerator, such as potassium metabisulphate or sodium thiosulphate. The initiator and accelerator, commonly referred to as catalysts, may conveniently be used in proportions of 0.1% to 2% each based on the weight of monomers to be copolymerized. The polymerization temperature may for example be from room temperature to 90° C., or more, as is conventional.

Examples of emulsifiers which are suited to the polymerization process of emulsions useful in this invention include alkaline metal and ammonium salts of alkyl, aryl, alkaryl and aralkyl sulphonates, sulphates and polyether sulphates, such as sodium vinyl sulphonate, and sodium methallyl sulphonate; the corresponding phosphates and phosphonates, such as phosphoethyl methacrylate; and alkoxylated fatty acids, esters, alcohols, amines, amides and alkylphenols.

Chain transfer agents, including mercaptans, polymercaptans and polyhalogen compounds are often desirable in the polymerization mixture to control polymer molecular weight.

The floor polish composition preferably comprises the water insoluble polymer as defined in any embodiment above, 0% or up to 100% of the equivalents of the acid residues in the polymer of at least one polyvalent metal ion or complex crosslinking agent and optionally at least one basic hydroxide or salt of an alkali metal, as taught in U.S. Pat. No. 4,517,330. Preferably, the polyvalent metal is a transition metal. A floor polish composition wherein the transition metal ion or complex crosslinking agent content is from 25% to 80% of the equivalent of the acid residues in the polymer and/or the molar ratio of transition metal content is from 1.0:0.25 to 1.0:2.0 is preferred. Still more preferred is a composition wherein the transition metal content is from 30% to 70% of the equivalent of the acid residues in the polymer and/or the molar ratio of transition to alkali metal is from 1.0:0.5 to 1.0:1.5.

The polyvalent and alkali metal ion and complex crosslinking agents useful in the present invention are well known in the art. These are described in for example, U.S. Pat. No. 3,328,325, U.S. Pat. No. 3,328,325, U.S. Pat. No. 3,467,610, U.S. Pat. No. 3,554,790, U.S. Pat. No. 3,573,329, U.S. Pat. No. 3,711,436, U.S. Pat. No. 3,808,036, U.S. Pat. No. 4,150,005, U.S. Pat. No. 4,517,330, U.S. Pat. No. 5,149,745, U.S. Pat. No. 5,319,018. The preferred polyvalent metal complexes include the diammonium zinc (II) and tetra-ammonium zinc (II) ions, cadmium glycinate, nickel glycinate, zinc glycinate, zirconium glycinate, zinc alanate, copper beta-alanate, zinc beta-alanate, zinc valanate, copper bis-dimethylamino acetate.

The polyvalent and alkali metal ion and complex crosslinking compounds are readily soluble in the aqueous medium of the polish composition, especially at a pH in the range 6.5 to 10.5. However, the polish composition containing these compounds dries to form a polish deposit which is essentially insoluble in water but still removable. The polyvalent metal complex may also be added as a solution to the water insoluble film forming polymer latex. This may be accomplished by solubilizing the metal complex in an alkaline solution such as dilute ammonia. Since the ammonia may complex with the polyvalent metal compound, a compound such as cadmium glycinate, when solubilized in an aqueous ammonia solution may be named cadmium ammonia glycinate. Other polyvalent metal complexes described may be similarly named.

Although, to be suitable, the polyvalent metal complex must be stable in an alkaline solution, a complex that is too stable is undesirable because dissociation of the metal ion would then be retarded during the film formation of the polish coating.

The floor polish composition should preferably have a minimum film forming temperature MFT of less than 100° C. and more preferably less than 80° C.

The polyvalent metal ion and complex crosslinking agent may be incorporated into the polish composition at any stage of its formulation. The coumarin and/or coumarin derivative may be incorporated into the floor polish composition at any stage of its formulation. Similarly, the basic salt of the alkaline metal may be incorporated with the polyvalent metal ion and complex crosslinking agent at any stage of the polish formulation.

In general, the floor polish compositions of the present invention will comprise the following main components:
 a) 10–100 parts by solids weight water insoluble polymer which has been previously or subsequently crosslinked with a polyvalent metal complex and/or alkali metal basic salt;
 b) 0–90 parts by solids weight wax emulsion;
 c) 0–90 parts by solids weight alkali soluble resin (ASR);
 d) 0.01–20 parts by weight of polymer solids wetting, emulsifying and dispersing agents, defoamer, leveling agent; optical brighteners, plasticizers and coalescing solvents, sufficient for polish film formation at application temperature;
 e) water, sufficient to make total polish solids 0.5% to 45%, preferably 5% to 30%. The total of a), b) and c) should be 100.

The amount of c), when present may be up to 100% of a) and is preferably from 3% to 25% of the weight of a). Satisfactory floor polish formulations have been prepared without the inclusion of an ASR. Thus, an ASR is not an essential component of a durable floor polish composition. Depending on the properties inherent to the polish vehicle composition and other formulation ingredients (d), the ASR may optionally be employed to moderately reduce total formulation costs, improve leveling and gloss properties, and increase the polish sensitivity to alkaline strippers, depending upon the ultimate balance of properties desired by the polish formulator and qualities of ASR.

For a high speed burnish polish compositions, the wax level should preferably be more than 6% by weight of the total solids of a), b) and c).

In addition to the coumarin and/or coumarin derivatives, the polish composition may contain other leveling agents and optical brighteners, which may be used in conventional amounts or less, depending upon the balance of properties desired by the formulator.

Conventional wetting agents, dispersing agents, defoamers, plasticizers and coalescing solvents may be used in conventional amounts, depending upon the balance of performance properties desired by the formulator. Other formulation ingredients, such as perfumes or odor-masking agents, dyes or colorants, bacteriocides and bacteriostats, may also be optionally included by the formulator.

The invention will now be more specifically described in terms of the following examples of some preferred embodiments which are given for the purposes of illustration only, and may be contrasted with the comparative tests also given below.

TEST METHODS

Floor Tests for Leveling Performance

The floor test areas were stripped of residual polish and repolished in the typical janitorial procedure as follows:

The floors were dust mopped to remove loose dirt, a 1:1 aqueous solution of commercial stripper solution ("*SSS Easy Strip*" Standardized Sanitation Systems, Inc., Burlington, Mass. 01803) was applied by string mop at a rate of ca. 1,000 square feet/gallon (25 $m^2$/l); after a five minute soak period, the floors were scrubbed with a sixteen inch (0.4 m) black stripping floor pad (3M Company, St. Paul, Minn. 55101; "Scotch Brite" Slim Line Floor Pad) on a 175 rpm floor machine (Howell Electric Motors, Plainfield, N.J., model 88400-026); the stripped floors were thoroughly rinsed twice by damp mopping with clear water, and allowed to dry. The stripped floors were divided into 20 square foot (2 m$^2$) sections perpendicular to the normal direction of floor traffic flow. To each of the sections four coats of polish to be tested were applied, with a SSS Finish Wide Band, Small cotton/rayon string mop No. 37627, at a rate of ca. 2,000 square feet/gallon (50 m$^2$/l). Immediately after the spreading of each coat was completed, an "x" was placed in the wet polish surface by drawing the string mop diagonally from corner to corner of the test area. Each coat was allowed to dry for one hour before the next coat was applied.

Coatings were applied to floors composed of homogenous vinyl and vinyl composition tiles, and cured at ambient conditions. After the coatings had dried they were examined visually to determine the extent of the disappearance of the "x" compared to a comparative polish. This test was designed to distinguish relative differences. Leveling was rated on the following scale:

5 —much better than the comparative
4 —better than the comparative
3 —equivalent to the comparative
2 —worse than the comparative
1 —much worse than the comparative Black Heel Mark and Scuff Resistance The method for determining black heel and scuff resistance described in Chemical Specialty Manufacturers Association Bulletin No. 9-73 was utilized, except that commercially available rubber shoe heels were used in place of the recommended 2" (5.08 cm) rubber cubes. Furthermore, instead of subjectively rating the coated substrate, the percentage of the coated substrate area covered by black heel and scuff marks was determined; this is conveniently performed with transparent graph paper. A black heel mark is an actual deposition of rubber onto or into the coating, whereas a scuff mark results from physical displacement of the coating which appears as an area of reduced gloss. Scuff and black heel marks can occur simultaneously at the point where the heel impacts the substrate; i.e., upon removal of a black heel mark, a scuff may be present.

Gloss

The method for determining the gloss performance of polish compositions is described in "Annual Book of ASTM Standards," Section 15, Volume 15.04, Test Procedure ASTM D 1455. A Gardner Byk Micro-Tri-Gloss meter, catalog number 4520, was used to record 60° and 20° gloss.

Recoatability

The method for determining the recoatability of water-based emulsion floor polishes is described in "Annual Book of ASTM Standards," Section 15, Volume 15.04, Test Procedure ASTM D 3153.

Water Resistance

The method for determining the water resistance of polish compositions is described in "Annual Book of ASTM Standards," Section 15, Volume 15.04, Test Procedure TM51 D 1793, and the following scale was used to rate the water resistance of the coating compositions:

Excellent—No water mark or perceptible damage to coating
Very Good—Faint water outline
Good—Slight degree of film whitening
Fair—Film whitening with some blisters and lifting
Poor—Complete film failure with gross whitening and loss of adhesion Detergent Resistance The method for determining detergent resistance is described in "Annual Book of ASTM Standards," Section 15, Volume 15.04, Test Procedure ASTM D 3207, except that a 1/20 dilution of Forward® (S. C. Johnson and Sons, Inc.; Racine, Wis.) in water was used as test detergent solution.

Removability

The method for determining polish removability is described in "Annual Book of ASTM Standards," Section 15, Volume 15.04, Test Procedure ASTM D 1792.

Film Formation

A draw-down using 0.4 mL of the coating composition was applied by means of a 2 inch (5.08 cm) wide blade applicator (as specified in ASTM D 1436), having a clearance of 0.008 inches (0.02 cm), to a length of 4 inches (10.16 cm) on a vinyl composition tile. Immediately after application of the polish, the tile was placed on a level surface in a refrigerator at 10° C. The dried film was rated as follows:

Excellent—No crazing
Very Good—Slight edge crazing
Good—Definite edge crazing
Fair—Definite edge crazing with very slight center crazing
Poor—Complete edge and center crazing

EXAMPLES

Formulation of floor polish composition based on Coumarin 1.

In order to properly evaluate the performance of an emulsion polymer intended for use in a polish vehicle, it is necessary that the polymer be formulated as a polish. The formulation of the emulsion polymers of this invention is done in the manner common to floor polish formulating practices. The ingredients used, and their proportions and manner of addition are the same as is commonly practiced with conventional technology emulsion polymers.

1A. Aqueous Floor Polish Formulation for Coumarin 1 modified emulsions for Examples 1–6, 13–15.
(Order of addition shown)

| Material | Function | Amount (parts by weight) |
|---|---|---|
| Water | diluent | 43.2 |
| FC-120 (1%)[1] | wetting agent | 1.00 |
| Kathon CG/ICP (1.5%)[2] | biocide | 0.03 |
| SE-21[3] | defoamer | 0.02 |
| Diethylene Glycol Ethyl Ether | coalescent | 2.63 |
| Dipropylene Glycol Methyl Ether | coalescent | 3.68 |
| Dibutyl Phthalate | plasticizer | 1.10 |
| Tributoxy Ethyl Phosphate | leveling aid | 1.58 |
| Emulsion (38%) | vehicle | 40.31 |
| ASR-Plus (35%)[2] | alkali soluble/swellable resin | 2.35 |
| AC-540N (30%)[4] | polyethylene wax emulsion | 4.10 |

Formulation Constants:
Polymer/ASR/Wax Ratio 88/7/5
Theoretical Non-Volatile Solids 20%
[1]3M Co. (Minneapolis, MN)
[2]Rohm and Haas Co. (Philadelphia, PA)
[3]Wacker Silicones Corp. (Adrian, MI)
[4]Allied-Signal Corp. (Morristown, NJ)

1B. Aqueous Floor Polish Formulation for Coumarin 1 modified
emulsions used for Examples 7–12.
(Order of addition shown)

| Material | Function | Amount (parts by weight) |
|---|---|---|
| Water | diluent | 44.61 |
| FC-120 (1%)[1] | wetting agent | 0.45 |
| Kathon CG/ICP (1.5%)[2] | biocide | 0.03 |
| SE-21[3] | defoamer | 0.02 |
| Diethylene Glycol Ethyl Ether | coalescent | 2.64 |
| Dipropylene Glycol Methyl Ether | coalescent | 1.64 |
| Tributoxy Ethyl Phosphate | leveling aid | 0.73 |
| Dibutyl Phthalate | plasticizer | 0.73 |
| Emulsion (38%) | vehicle | 36.57 |
| ASR-Plus (35%)[2] | alkali soluble/swellable resin | 2.65 |
| E-43N (40%)[4] | polypropylene wax emulsion | 4.64 |
| AC-325N (35%)[5] | polyethylene wax emulsion | 5.29 |

Formulation Constants:
Polymer/ASR/Wax Ratio 75/5/20
Theoretical Non-Volatile Solids 20%
[1]3M Co. (Minneapolis, MN)
[2]Rohm and Haas Co. (Philadelphia, PA)
[3]Wacker Silicones Corp. (Adrian, MI)
[4]Eastman Chemical Corp. (Eastport, TN)
[5]Allied-Signal Corp. Morristown, NJ)

Examples 1–3 demonstrate the improvement in leveling properties of the invention using a conventional aqueous based polymer prepared according to the technology taught in U.S. Pat. No. 4,517,330 by Zdanowski, et al. A polymer latex was prepared with a monomer composition of 35BA/9MMA/40ST/16MAA. The latex composition further contains 3.6% $Zn^{++}$ on latex solids, added as $Zn(NH_3)_4(HCO_3)_2$ and 0.7% $K^+$ on latex solids, added as KOH. Example 1 is a comparative containing no coumarin 1 and 4.6% dibutyl phthalate.

Example 1

Example 1 was formulated into the test composition as described in formulation 1A.

Example 2

The composition of Example 2 contains 1% coumarin 1 and has the same composition as described in Example 1. 1.21 g of a 14.8% solution of coumarin 1 dissolved in dibutyl phthalate was added to 100 g of latex at ambient conditions. Example 2 was formulated into the test composition as described in formulation 1A

Example 3

The compositions of Examples 1 and 2 were tested for leveling properties. The results, listed in Table 1, show that the coating composition having coumarin 1 improves the leveling characteristic of a coating containing a conventional leveling aid.

|  | Example 1 (comparative) no coumarin 1 | Example 2 1% coumarin 1 |
|---|---|---|
| Leveling | 3 | 4 |
| Black Heel Mark Resistance (% Coverage) | 3.5 | 3.5 |
| Scuff Mark Resistance (% Coverage) | 2.9 | 3.1 |
| Gloss 60°, 20° | 80°, 20° | 80°, 22° |
| Recoatability | Good | Good |
| Water Resistance | Very Good - Excellent | Very Good - Excellent |
| Detergent Resistance | Excellent | Excellent |
| Removability | Excellent | Excellent |
| Film Formation | Excellent | Excellent |

Examples 4–6 demonstrate the improvement in leveling properties of the invention using a conventional polymer having the same latex composition as described in Example 1.

Example 4

Example 4 is a comparative containing no coumarin 1. Example 4 was formulated into the test composition as described in Example 1, except that no tributoxy ethyl phosphate was used.

Example 5

The composition of Example 5 contains 1% coumarin 1 and has the same composition as described in Example 1. 1.21 g of a 14.8% solution of coumarin 1 dissolved in dibutyl phthalate was added to 100 g of latex at ambient conditions.

Example 5 was formulated into the test composition as described in Example 1, except that no tributoxy ethyl phosphate was used.

Example 6

|  | Example 4 (comparative) no coumarin 1 | Example 5 1% coumarin 1 |
|---|---|---|
| Leveling | 3 | 4 |
| Black Heel Mark Resistance (% Coverage) | 3.0 | 3.0 |
| Scuff Mark Resistance (% Coverage) | 2.5 | 2.7 |
| Gloss 60°, 20° | 77°, 32° | 76°, 32° |
| Recoatability | Good | Good |
| Water Resistance | Very Good - Excellent | Very Good - Excellent |
| Detergent Resistance | Excellent | Excellent |
| Removability | Excellent | Excellent |
| Film Formation | Excellent | Excellent |

Examples 7–9 demonstrate the improvement in leveling properties of the invention using a conventional aqueous based polymer formulated into a coating composition containing a leveling aid, tributoxy ethyl phosphate.

Example 7

A polymer latex was prepared according to the technology taught in U.S. Pat. No. 4,150,005 by Gehman, et. al. having a monomer composition of 30 BA/10.5 MMA/5 HEMA/4.5 MAA//40 STY/5 MMA/5AA . The latex composition further contains 3.2% $Zn^{++}$ on latex solids, added as $Zn(NH_3)_4(HCO_3)_2$. Example 7 is a comparative containing no coumarin 1 and 4.6% dibutyl phthalate. Example 7 was formulated into the test composition as described in Formulation 1B.

Example 8

The coating composition of Example 8 contains 1% coumarin 1 and has the same composition as described in Example 7, except with no dibutyl phthalate. 1.21 g of a 14.8% solution of coumarin 1 dissolved in dibutyl phthalate was added to 100 g of latex at ambient conditions. Example 8 was formulated into the test composition as described in Example 7.

Example 9

| Leveling | Example 7 (comparative) no coumarin 1 3 | Example 8 1% coumarin 1 4 |
|---|---|---|
| Black Heel Mark Resistance (% Coverage) | 3.2 | 3.3 |
| Scuff Mark Resistance (% Coverage) | 4.5 | 4.5 |
| Gloss 60°, 20° | 85°, 35° | 86°, 35° |
| Recoatability | Good | Good |
| Water Resistance | Very Good - Excellent | Very Good - Excellent |
| Detergent Resistance | Excellent | Excellent |
| Removability | Excellent | Excellent |
| Film Formation | Excellent | Excellent |

Examples 10–12 demonstrate the enhancement in leveling properties of the invention using a conventional polymer and formulated into a coating composition without the use of leveling aid, tributoxy ethyl phosphate.

Example 10

A polymer latex was prepared having the same latex composition as described in Example 7. This latex was formulated into the test composition as described in Example 7, except with no tributoxy ethyl phosphate. Example 10 is a comparative containing no coumarin 1.

Example 11

The coating composition of Example 11 contains 1% coumarin 1 and has the same composition as described in Example 10, except with no dibutyl phthalate. 1.21 g of a 14.8% solution of coumarin 1 dissolved in dibutyl phthalate was added to 100 g of latex at ambient conditions. Example 11 was formulated into the test composition as described in Example 10.

Example 12

| Leveling | Example 10 (comparative) no coumarin 1 3 | Example 11 1% coumarin 1 4 |
|---|---|---|
| Black Heel Mark Resistance (% Coverage) | 3.2 | 3.1 |
| Scuff Mark Resistance (% Coverage) | 3.9 | 4.0 |
| Gloss 60°, 20° | 80°, 30° | 80°, 32° |
| Recoatability | Good | Good |
| Water Resistance | Very Good - Excellent | Very Good - Excellent |
| Detergent Resistance | Excellent | Excellent |
| Removability | Excellent | Excellent |
| Film Formation | Excellent | Excellent |

Examples 13–15 demonstrate the improvement in leveling properties of the invention using a conventional aqueous based polymer formulated into a coating composition containing a leveling aid, tributoxy ethyl phosphate.

Example 13

A polymer latex was prepared according to the technology taught in U.S. Pat. No. 3,328,325 by Zdanowski et al. having a monomer composition of 62MMA/28BA/10MAA. The latex composition further contains 3.2% $Zn^{++}$ on latex solids, added as $Zn(NH_3)_4(HCO_3)_2$. Example 13 is a comparative containing no coumarin 1 and 4.6% dibutyl phthalate. This latex was formulated into the test composition as described in Example 1.

Example 14

The coating composition of Example 14 contains 1% coumarin 1 and has the same composition as described in Example 13, except with no dibutyl phthalate. 1.21 g of a 14.8% solution of coumarin 1 dissolved in dibutyl phthalate was added to 100 g of latex at ambient conditions. Example 14 was formulated into the test composition as described in Example 13.

Example 15

| Leveling | Example 13 (control) no coumarin 1 3 | Example 14 1% coumarin 1 4 |
|---|---|---|
| Black Heel Mark Resistance (% Coverage) | 3.5 | 3.5 |
| Scuff Mark Resistance (% Coverage) | 5.0 | 4.8 |
| Gloss 60°, 20° | 59°, 18° | 58°, 18° |
| Recoatability | Good | Good |
| Water Resistance | Very Good - Excellent | Very Good - Excellent |
| Detergent Resistance | Excellent | Excellent |
| Removability | Excellent | Excellent |
| Film Formation | Excellent | Excellent |

What is claimed is:

1. A process of improving the leveling properties of a floor polish composition comprising an aqueous suspension or dispersion of water insoluble emulsion polymer, wherein the process comprises adding a compound selected from the group consisting of coumarin, a derivative thereof, and mixtures thereof to said composition in an amount of from about 0.05 to about 10% by weight of polymer solids in the composition.

2. A process as claimed in claim 1, wherein the coumarin or coumarin derivative has the following general structure:

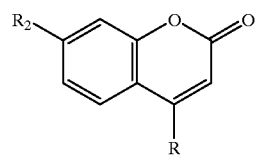

where R is H or a (C1 to C12) alkyl or a (C3–C12) cycloaliphatic group or a (C1 to C12) alkyl halide group or a carboxy group and $R_2$ is H or a hydroxy (—OH) or an amine (—$NH_2$) or a (C1 to C12) alkyl amine or a cycloaliphatic amine group.

3. A process as claimed in claim 1, wherein the coumarin derivative is 7-(diethylamino)-4-methylcoumarin.

4. A process as claimed in claim 1, wherein the coumarin and/or derivative thereof is present in an amount of from 0.1 to 5% by weight of said polymer solids.

5. The process as claimed in claim 1, wherein the water insoluble emulsion polymer is prepared from one or more monomers having acid functional residues.

6. The process as claimed in claim 5, wherein the water insoluble emulsion polymer contains a compound selected from the group consisting of metal ions, complex cross-linking agents and mixtures thereof.

7. The process as claimed in claim 1, wherein the water insoluble emulsion polymer is a copolymer having a glass transition temperature (Tg) of at least 10° C.

8. The process as claimed in claim 1, wherein the water insoluble emulsion polymer is prepared from one or more monomers, the polymer having a glass transition temperature (Tg) of at least 40° C.

9. The process as claimed in claim 1, wherein the water insoluble emulsion polymer is formed from a mixture of monomers selected from the group consisting of vivl aromatic monomers, $C_1$–$C_{18}$, acidic monomers, vinyl esters of $C_1$–$C_{18}$ acidic monomers, noniogenic monomers, and ($C_1$–$C_{20}$) alkyl(meth)acrylates.

10. The process as claimed in claim 5, wherein the acid functional residues are selected from the group consisting of maleic acid, fumaric acid, aconitic acid, crotonic acid, citraconic acid, acryloxypropionic acid, acrylic acid, methacrylic acid and itaconic acid.

11. A process for improving leveling and brightness in a floor polish composition comprising adding to an aqueous suspension or dispersion of water insoluble emulsion polymer a compound selected from the group consisting of coumarin, a coumarin derivative, and mixtures thereof, in an amount of from about 0.05 to about 10% by weight of polymer solids in the composition.

12. The process as claimed in claim 11, wherein the water insoluble emulsion polymer is prepared from one or more monomers having acid functional residues.

13. The process as claimed in claim 11, wherein the water insoluble emulsion polymer is formed from a mixture of monomers selected from the group consisting of vinyl aromatic monomers, $C_1$–$C_{18}$ acidic monomers, vinyl esters of $C_1$–$C_{18}$ acidic monomers, noniogenic monomers, and ($C_1$–$C_{20}$) alkyl(meth)acrylates.

14. The process as claimed in claim 12, wherein the acid functional residues are selected from the group consisting of maleic acid, fumaric acid, aconitic acid, crotonic acid, citraconic acid, acryloxypropionic acid, acrylic acid, methacrylic acid and itaconic acid.

15. The process as claimed in claim 11, wherein the water insoluble emulsion polymer is a copolymer having a glass transition temperature (Tg) of at least 10° C.

16. A multifunctional floor polish composition comprising:
(i) an aqueous suspension or dispersion of water insoluble emulsion polymer prepared from a mixture of monomers, one or more monomers having acid functional residues; and
(ii) a compound selected from the group consisting of coumarin, a derivative thereof, and a mixture thereof, wherein the compound is present in the floor polish composition in an amount of from about 0.05 to about 10% by weight of polymer solids in the composition.

17. The multifunctional floor polish composition as claimed in claim 16, wherein the mixture of monomers is selected from the group consisting of vinyl aromatic monomers, $C_1$–$C_{18}$ acidic monomers, $C_1$–$C_{20}$ alkyl(meth)acrylates, noniogenic monomers, vinyl esters of $C_1$–$C_{18}$ acidic monomers, and wherein the coumarin derivative is 7-(diethylamino)4-methylcoumarin.

18. The multifunctional floor polish composition as claimed in claim 16, wherein the water insoluble emulsion polymer contains from 10 to 50% by weight of at least one vinyl aromatic monomer, from 5 to 20% by weight of at least one acidic monomer, and from 30 to 70% by weight of at least one $C_1$–$C_{12}$ alkyl(meth acrylate monomer.

* * * * *